United States Patent [19]

Anderson et al.

[11] Patent Number: 5,212,262

[45] Date of Patent: May 18, 1993

[54] EPOXY RESIN ADVANCED WITH DIPHENOL/DIGLYCIDYL ETHER ADDUCTS

[75] Inventors: Kenneth W. Anderson, Lake Jackson; Deborah I. Haynes, Freeport; Ross C. Whiteside, Jr., Angleton, all of Tex.

[73] Assignee: The Dow Chemical Company, Midland, Mich.

[21] Appl. No.: 516,018

[22] Filed: Apr. 27, 1990

Related U.S. Application Data

[60] Continuation-in-part of Ser. No. 372,064, Jun. 27, 1989, abandoned, which is a division of Ser. No. 128,249, Dec. 3, 1987, Pat. No. 4,863,575.

[51] Int. Cl.$^5$ .................. C08L 63/02; C08K 63/20
[52] U.S. Cl. .................. 525/524; 525/423; 525/437; 525/482; 525/510; 525/527; 523/403; 523/404
[58] Field of Search .......... 528/103, 104, 108, 109, 528/111, 117, 118, 121, 123; 523/404, 403; 525/423, 437, 482, 510, 524, 527

[56] References Cited

U.S. PATENT DOCUMENTS

| | | | |
|---|---|---|---|
| 3,839,252 | 10/1974 | Bosso et al. | 260/29.2 EP |
| 3,936,405 | 2/1976 | Sturni et al. | 260/29.2 EP |
| 3,947,339 | 3/1976 | Jerabek et al. | 204/181 |
| 4,417,033 | 11/1983 | Bowditch | 525/481 |
| 4,507,461 | 3/1985 | Bowditch | 528/104 |
| 4,698,141 | 10/1987 | Anderson et al. | 523/415 |
| 4,737,553 | 4/1988 | Gannon et al. | 525/481 |
| 4,835,225 | 5/1989 | Massingill, Jr. et al. | 525/481 |
| 4,845,172 | 7/1989 | Brytus et al. | 525/481 |
| 4,857,567 | 8/1989 | Laugal et al. | 523/415 |
| 4,868,230 | 9/1989 | Rao et al. | 523/403 |

FOREIGN PATENT DOCUMENTS 0253405 1/1988 European Pat. Off. .
0315164 5/1989 European Pat. Off. .

OTHER PUBLICATIONS

Chem. Abst. 112:8764d (Jap. Kokai Tokkyo Koho JP 01/116,100 Published May 9, 1989).
Derwent Abstract 88-152736/22 (JP63/095218-A published Apr. 4, 1988).

Primary Examiner—Robert E. Sellers

[57] ABSTRACT

A composition useful as an electrodepositable coating comprises a curing agent and an advanced epoxy resin prepared by advancing a diglycidyl ether of a dihydric phenol with an aromatic hydroxyl-containing reaction product of a diglycidyl ether of an oxyalkylated dihydric phenol and/or a diglycidyl ether of a (cyclo) aliphatic diol, optionally with a dihydric phenol and/or a monofunctional capping agent, combined with a diglycidyl ether of a dihydric phenol.

11 Claims, No Drawings

EPOXY RESIN ADVANCED WITH DIPHENOL/DIGLYCIDYL ETHER ADDUCTS

CROSS-REFERENCE TO RELATED APPLICATIONS

This application is a continuation-in-part of application Ser. No. 07/372,064 filed Jun. 27, 1989, now abandoned which is a division of application Ser. No. 07/128,249 filed Dec. 3, 1987 (now U.S. Pat. No. 4,863,575) which claims a priority date of Jul. 16, 1987 (WO) PCT International Application PCT/US87/01690.

FIELD OF THE INVENTION

The invention is concerned with advanced epoxy resin compositions, a method for their preparation and the use of such compositions in cathodic electrodeposition.

BACKGROUND OF THE INVENTION

Electrodeposition has become an important method for the application of coatings over the last two decades and continues to grow in popularity because of its efficiency, uniformity and environmental acceptance. Cathodic electrodeposition has become dominant in areas where highly corrosion-resistant coatings are required, such as in primers for automobile bodies and parts. Epoxy based systems provide the best overall performance in this application and are widely used.

Cathodic electrodeposition resins based on conventional epoxies obtained by reacting liquid diglycidyl ethers of bisphenol A with bisphenol A to produce higher molecular weight epoxy resins have known disadvantages. Such products tend to have excessively high softening points resulting in poor flow out. In addition, such products require excessive amounts of solvent during their preparation. In order to improve flow, it has been proposed to modify such conventional epoxy resins by reaction with a diol in the presence of a tertiary amine catalyst. Thus, Bosso et al., U.S. Pat. No. 3,839,252, describes modification with polypropylene glycol. Marchetti et al., U.S. Pat. No. 3,947,339, teaches modification with polyester diols or polytetramethylene glycols. Wismer et al., U.S. Pat. No. 4,419,467, describes still another modification with diols derived from cyclic polyols reacted with ethylene oxide. These various modifications, however, also have disadvantages. Tertiary amines or strong bases are required to effect the reaction between the primary alcohols and the epoxy groups involved. Since these reactions require long cook times, they are subject to gellation because of competitive polymerization of the epoxy groups by the base catalyst. In addition epoxy resins containing low levels of chlorine are required to prevent deactivation of this catalyst.

U.S. Pat. Nos. 4,419,467 and 4,575,523 describe the reaction of an epoxy resin with oxyalkylated diols to form resins useful in electrodeposition. Such reactions have several attendant disadvantages, such as described in U.S. Pat. No. 4,260,720, col. 1, lines 25-51. Use of the glycidyl ethers of such a diol, as described herein, eliminates or greatly reduces these problems.

U.S. Pat. No. 4,260,720 teaches the use of glycidyl ethers of cyclic polyols, including oxyalkylated polyphenols, in combination with polymercapto compounds to form electrodeposition resins. These glycidyl ethers were not used in combination with glycidyl ethers of polyphenols and polyphenols, as described herein, nor were there advantageous properties as modifiers for bisphenol A-based epoxy resins in electrodeposition anticipated, such as improvement in film thickness and appearance.

U.S. Pat. No. 4,698,141 issued Oct. 6, 1987 to Anderson and Hickner discloses an improvement in a method for preparing an advanced epoxy cationic resin from an epoxy-based resin containing oxirane groups by converting at least some of the oxirane groups to cationic groups. The improvement is stated to reside in using as the epoxy-based resin an advanced epoxy resin obtained by reacting in the presence of a suitable catalyst (1) a diglycidyl ether of a polyether polyol such as the condensation product of dipropylene glycol and epichlorohydrin having an epoxy equivalent weight of 185, (2) a diglycidyl ether of a dihydric phenol such as a diglycidyl ether of bisphenol A and (3) a dihydric phenol such as bisphenol A and optionally a capping agent such as p-nonylphenol.

U.S. Pat. No. 4,868,230 issued Sep. 19, 1989 to Rao and Hickner discloses an improvement in a method for preparing an advanced epoxy cationic resin from an epoxy-based resin containing oxirane groups by converting at least some of the oxirane groups to cationic groups. The improvement is stated to reside in using as the epoxy-based resin an advanced epoxy resin obtained by reacting in the presence of a suitable catalyst (1) a diglycidyl ether of an aliphatic diol which is essentially free of ether oxygen atoms, such as a diglycidyl ether of 1,4-butanediol, (2) a diglycidyl ether of a dihydric phenol such as a diglycidyl ether of bisphenol A and (3) a dihydric phenol such as bisphenol A and optionally a capping agent such as p-nonylphenol.

Many coating formulations applied by electrodeposition include pigments to provide color, or opacity or application or film properties. U.S. Pat. No. 3,936,405, Sturni et al., describes pigment grinding vehicles especially useful in preparing stable, aqueous pigment dispersions for water-dispersible coating systems, particularly for application by electrodeposition. The final electrodepositable compositions, as described, contain the pigment dispersion and an ammonium or amine salt group solubilized cationic electrodepositable epoxy-containing vehicle resin and other ingredients typically used in electrodepositable compositions. Among the kinds of resins used are various polyepoxides such as polyglycidyl ethers of polyphenols, polyglycidyl ethers of polyhydric alcohols and polyepoxides having oxyalkylene groups in the opoxy molecule.

The automobile industry still has needs in the areas of controlled film thickness and lower temperature cure systems. The ability to build thicker, uniform films which are smooth and free of defects will allow the elimination of an intermediate layer of paint known as a primer surface or spray primer, previously required to yield a sufficiently smooth surface for the topcoat. Such an elimination results in removal of one paint cycle and provides more efficient operations.

European Patent Application 0,253,405 published Jan. 20, 1988 discloses cationic resins prepared from an advanced epoxy resin prepared in one step by reacting in the presence of a suitable catalyst, (A) a composition comprising (1) at least one diglycidyl ether of a polyol and (2) at least one diglycidyl ether of a dihydric phenol with (B) at least one dihydric phenol and (C) optionally, a monofunctional capping agent.

The cationic advanced epoxy resins prepared by the procedure of the European Patent Application 0,253,405 satisfies many of the requirements desired by the automobile industry. Nevertheless, it would be desired to have available cationic resins which provide further improvements in coating properties such as higher rupture voltage, lower bath conductivity, and the attendant improvement in appearance at higher coating voltages, and the like. Thicker electrocoat primers may also provide improved corrosion resistance.

SUMMARY OF THE INVENTION

The present invention pertains to an advanced epoxy resin composition comprising the product resulting from reacting a composition comprising
(1) the aromatic hydroxyl-containing product resulting from reacting a composition comprising
  (a) at least one diglycidyl ether of (i) an oxyalkylated aromatic diol, or (ii) at least one compound having two hydroxyl groups per molecule in which the hydroxyl groups are attached to an aliphatic or cycloaliphatic carbon atom and which compound is free of aromatic rings; and (iii) optionally, a diglycidyl ether compound different from (i) and (ii) which is present in an amount such that the amount of epoxy groups contributed by component (iii) based upon the total amount of epoxy groups contributed by components (i), (ii) and (iii) is from about zero to about 75 percent; and
  (b) at least one compound containing two aromatic hydroxyl groups per molecule; wherein components (a) and (b) are employed in amounts such that there are more aromatic hydroxyl groups present than glycidyl ether groups;
(2) at least one diglycidyl ether of a compound containing two aromatic hydroxyl groups per molecule;
(3) optionally, one or more compounds containing two aromatic hydroxyl groups per molecule; and
(4) optionally, a monofunctional capping agent;
wherein components (1) and (2) are employed in amounts such that the resultant product has an epoxide equivalent weight greater than that of component (2); component (3), when present, is employed in an amount which provides a total amount of aromatic hydroxyl groups from components (1) and (3) per epoxide group contained in component (2) of from about 0.5:1 to about 0.95:1; and component (4), when present, is employed in an amount which provides a ratio of epoxy-reactive groups contained in component (4) per glycidyl group not consumed by reaction of components (1) and (3) with component (2) suitably from about zero:1 to about 0.7:1, more suitably from about 0.1:1 to about 0.7:1, most suitably from about 0.2:1 to about 0.5:1.

The present invention also pertains to a composition comprising a mixture of
(A) an advanced epoxy resin resulting from reacting a composition comprising
  (1) the aromatic hydroxyl-containing product resulting from reacting a composition comprising
    (a) at least one diglycidyl ether of (i) an oxyalkylated aromatic diol, or (ii) at least one compound having two hydroxyl groups per molecule in which the hydroxyl groups are attached to an aliphatic or cycloaliphatic carbon atom and which compound is free of aromatic rings; and (iii) optionally, a diglycidyl ether compound different from (i) and (ii) which is present in an amount such that the amount of epoxy groups contributed by component (iii) based upon the total amount of epoxy groups contributed by components (i), (ii) and (iii) is from about zero to about 75 percent; and
    (b) at least one compound containing two aromatic hydroxyl groups per molecule; wherein components (a) and (b) are employed in amounts such that there are more aromatic hydroxyl groups present than glycidyl ether groups;
  (2) at least one diglycidyl ether of a compound containing two aromatic hydroxyl groups per molecule;
  (3) optionally, one or more compounds containing two aromatic hydroxyl groups per molecule; and
  (4) optionally, a monofunctional capping agent; and
(B) at least one diglycidyl ether of a compound having two aromatic hydroxyl groups per molecule; and
wherein components (A1) and (A2) are employed in amounts such that the resultant product has an epoxide equivalent weight greater than that of component (A2); component (A3) is present in an amount of from about zero to about 25 percent by weight based on the total weight of components (1), (2) and (3); and component (A4), if present, is employed in an amount of from about zero to about 15 percent by weight based on the total weight of components (1), (2), (3) and (4); and components (A) and (B) are present in an amount such that from about 25 to about 95 percent of the total amount of glycidyl ether groups are contributed by component (A) and from about 5 to about 75 percent of the total amount of glycidyl ether groups are contributed by component (B).

Another aspect of the present invention pertains to cationic resins obtained by reacting the aforementioned resins with a nucleophilic compound and adding an organic acid and water at at least one point during the preparation of the cationic resin.

The present invention further pertains to a coating composition comprising aqueous dispersions of the above-described cationic resins.

The present invention further pertains to curable compositions comprising the aforementioned epoxy resin compositions and at least one suitable curing agent therefor.

The present invention also pertains to articles resulting from curing the aforementioned curable compositions.

The present invention makes possible the preparation of cationic resins which provide improvements in one or more coating properties such as an improvement in one or more of the properties of electrodepositable coatings including higher rupture voltage, lower bath conductivity, and the attendant improvement in appearance at higher coating voltages, and the like. Also, thicker electrocoat primers may also provide improved corrosion resistance.

DETAILED DESCRIPTION OF THE INVENTION

The aromatic hydroxyl-containing product component (1) is prepared by reacting a composition comprising (a) at least one diglycidyl ether of (i) an oxyalkylated aromatic diol, or (ii) at least one compound having two hydroxyl groups per molecule in which the hydroxyl groups are attached to an aliphatic carbon atom and which compound is free of aromatic rings, and (iii), optionally, a diglycidyl ether compound different from (i) and (ii) which is present in an amount such that the amount of epoxy groups contributed by component (iii) based upon the total amount of epoxy groups contributed by components (i), (ii) and (iii) is suitably from about zero to about 75, percent, more suitably from about zero to about 50, most suitably from about zero to about 30 percent; (b) at least one compound containing two aromatic hydroxyl groups per molecule; and (c) optionally, at least one diglycidyl ether of a compound containing two aromatic hydroxyl groups per molecule.

The aromatic hydroxyl-containing product is usually prepared by conducting the reaction at a temperature in the range of from about 100° C. to about 220° C., preferably from about 125° C. to about 200° C., more preferably from about 150° C. to about 180° C., for a time sufficient to substantially complete the reaction, suitably from about 5 minutes to about 2 hours, more suitably from about 10 minutes to about 1 hour, most suitably from about 15 minutes to about 45 minutes, in the presence of a suitable catalyst. The reaction can, optionally, be conducted in an appropriate solvent to reduce the viscosity, facilitate mixing and handling, and assist in controlling the heat of reaction.

Many useful catalysts for the desired reactions are known in the art. Examples of suitable catalysts include ethyltriphenylphosphonium acetate•acetic acid complex; ethyltriphenylphosphonium chloride, bromide, iodide, or phosphate; and tetrabutylphosphonium acetate•acetic acid complex. The catalysts are typically used at levels of from about 0.0001 to about 0.05 mole of catalyst per epoxide group.

Appropriate solvents include aromatic solvents, glycol ethers, glycol ether esters, high boiling esters or ketones, or mixtures. Other useful solvents will be apparent to those skilled in the art. Preferred solvents are ethylene glycol monobutylether, xylene and propylene glycol monophenylether. Solvent content can range from zero to 30 percent of the reaction mixture. A solvent is usually chosen which is compatible with the subsequent cation-forming reactions and with the final coating composition so that the solvent does not require subsequent removal.

The components (1a) and (1b) are employed in amounts such that there are more aromatic hydroxyl groups present than glycidyl ether (epoxy) groups, suitably in amounts which provide a ratio of aromatic hydroxyl groups per glycidyl ether group of from about 1.05:1 to about 10:1, more suitably from about 1.1:1 to about 7.5:1, most suitably from about 1.2:1 to about 6:1. These ratios are dependent upon the level of component (1a) in the total reaction mixture and the epoxide equivalent weight desired of the final product, as wels as the amount of components (3) and (4) employed, if any.

The advanced epoxy resin composition is prepared by reacting a composition comprising a mixture of (1) the aforementioned aromatic hydroxyl-containing product; (2) at least one diglycidyl ether of a compound containing two aromatic hydroxyl groups per molecule; (3) optionally, one or more compounds containing two aromatic hydroxyl groups per molecule; and (4) optionally, a monofunctional capping agent.

The aromatic hydroxyl-containing product component (1) and the diglycidyl ether of a compound containing two aromatic hydroxyl groups per molecule, component (2), are employed such that the resultant product contains an epoxide equivalent weight (EEW) greater than that of component (2), usually in an amount such that the ratio of aromatic hydroxyl groups per epoxide (glycidyl ether) group is suitably from about 0.01:1 to about 0.95:1, more suitably from about 0.05:1 to about 0.9:1, most suitably from about 0.08:1 to about 0.8:1.

The optional compound containing two aromatic hydroxyl groups, component (3), is employed in an amount which provides the final advanced epoxy resin product with the desired epoxide equivalent weight (EEW). Typically, this amount is that which provides, when added to the aromatic hydroxyl groups provided by component (1), a total ratio of aromatic hydroxyl groups per glycidyl ether group of suitably from about 0.5:1 to about 0.95:1, more suitably from about 0.5:1 to about 0.9:1, most suitably from about 0.55:1 to about 0.8:1

The optional monofunctional capping agent, component (4), is employed in an amount suitably from about zero to about 15, more suitably from about 1 to about 15, most suitably from about 2 to about 10 percent by weight based on the total weight of components (1), (2), (3) and (4)

The optional monofunctional capping agent, component (4), is alternatively employed in an amount which provides a ratio of epoxy-reactive groups contained in component (4) per glycidyl group not consumed by reaction of components (1) and (3) with component (2) suitably from about zero:1 to about 0.7:1, more suitably from about 0.1:1 to about 0.7:1, most suitably from about 0.2:1 to about 0.5:1.

Glycidyl ethers of dihydric phenols (glycidyl ethers of compounds containing an average of about two aromatic hydroxyl groups per molecule) useful for the preparation of these resins are those having an average of more than one, preferably an average of two, vicinal epoxide groups per molecule. These polyepoxides can be produced by condensation of an epihalohydrin with a dihydric phenol in the presence of a basic-acting substance, such as an alkali metal hydroxide.

Particularly useful such glycidyl ethers of dihydric phenols are represented by Formulas I and II:

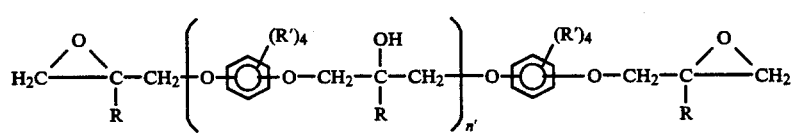

Formula I

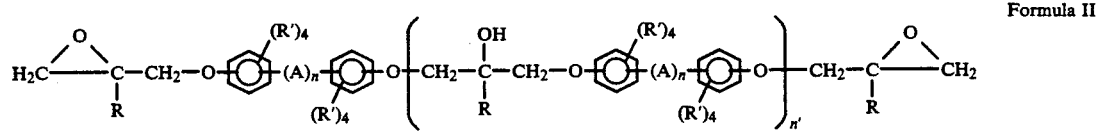

Formula II wherein A is a divalent hydrocarbon group having suitably from 1 to 12, more suitably 1 to 6, carbon include, for example, those represented by the following Formulas III or IV

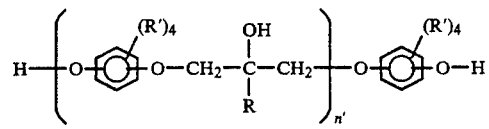

Formula III

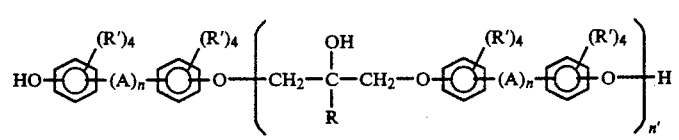

Formula IV atoms, —S—, —S—S—, —SO$_2$—, —SO—, —CO—, —O—CO—O—, or —O—; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen, preferably chlorine or bromine; n has a value of zero or 1; and n' has a value suitably from zero to 10, more suitably from 0.1 to 5.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic and cycloaliphatic groups can be saturated or unsaturated. Likewise, the term hydrocarbyloxy means a hydrocarbyl group having an oxygen linkage between it and the carbon atom to which it is attached.

The preferred polyglycidyl ethers of dihydric phenols (compounds having two aromatic hydroxyl groups per molecule) are the diglycidyl ether of bisphenol A and the oligomeric glycidyl ethers of bisphenol A.

Suitable dihydric phenols which can be employed herein to prepare the aforementioned polyepoxides wherein A, R, R', n and n' are as defined above.

Particularly suitable dihydric phenols useful for the production of these polyepoxides include 2,2-bis(4-hydroxyphenyl)-propane (bisphenol A), 1,1-bis(2-hydroxyphenyl)-1-phenylethane (bisphenol AP), 1,1-bis(4-hydroxyphenyl)ethane, bis(4-hydroxyphenyl)methane (bisphenol F), p,p'-hydroxybiphenyl, resorcinol, catechol, hydroquinone, or the like.

The diglycidyl ethers of oxyalkylated aromatic diols (component 1a1) useful in the preparation of the advanced epoxy resins of the present invention are those which can be represented by the following Formula V:

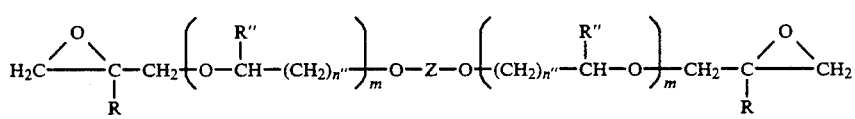

Formula V wherein R is as hereinbefore defined; R" is hydrogen, an alkyl group having suitably from 1 to 6, more suitably from 1 to 4, carbon atoms or a hydrocarbyl, or a hydrocarbyloxy group having from 1 to about 4 carbon atoms; each m is independently an integer suitably from 1 to 25, more suitably from 1 to 15, most suitably from 1 to 10; and Z is a divalent aromatic group having suitably from 6 to 20, more suitably from 6 to 15, carbon atoms or Z is a group represented by the following Formulas A, B, C or D:

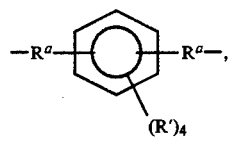

Formula A

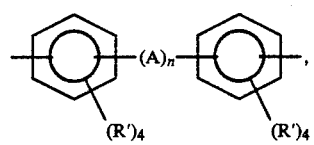

Formula B

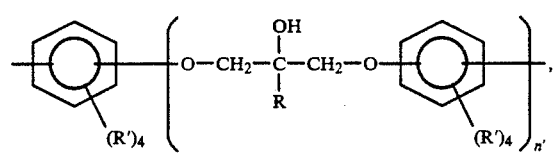

Formula C

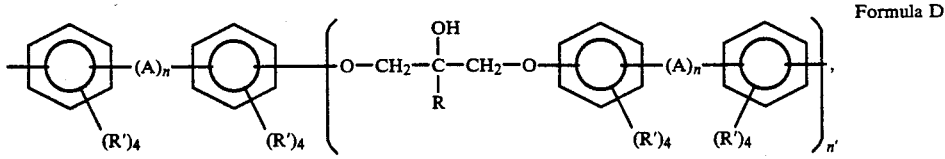

Formula D wherein A, R, R', n, and n' are defined as hereinbefore; each $R^a$ is independently a divalent hydrocarbon group having from 1 to about 6 carbon atoms; and n" has a value of 1 or 3.

The glycidyl ethers of the oxyalkylated aromatic diols are produced by the condensation of an epihalohydrin with an oxyalkylated polyol represented by the following Formula VI:

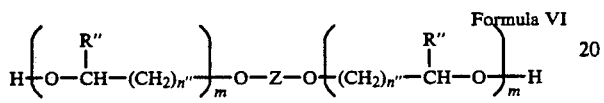

Formula VI wherein R", Z, Z', n" and m are defined as hereinbefore. The resulting halohydrin product is then dehydrohalogenated by known methods with a basic acting substance, such as sodium hydroxide to produce the corresponding diglycidyl ether.

The oxyalkylated diols of Formula VI are produced by reacting a diol of the following Formula VII

(Formula VII)

wherein Z is defined as hereinbefore, with the appropriate molar ratio of ethylene oxide, propylene oxide, butylene oxide, tetrahydrofuran, styrene oxide or an alkyl or aryl glycidyl ether or mixtures thereof. Combinations of these oxides added in sequential manner can also be used so as to form block copolymers rather than random polymers. Examples of useful aromatic diols include, bisphenol A, bisphenol F, hydroquinone, dihydroxydiphenyl oxide, resorcinol, p-xylenol and bisphenol capped epoxy resin.

The diglycidyl ethers of compounds having two hydroxyl groups per molecule which hydroxyl groups (component Iaiii) are attached to an aliphatic or cycloaliphatic carbon atom and which compounds are free of aromatic rings useful in the preparation of the resins of the present invention are those which can be represented by the following Formula VIII:

Formula A

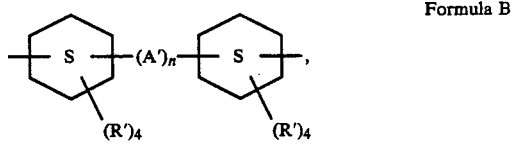

Formula B

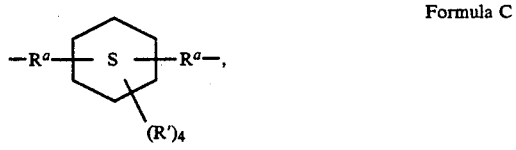

Formula C

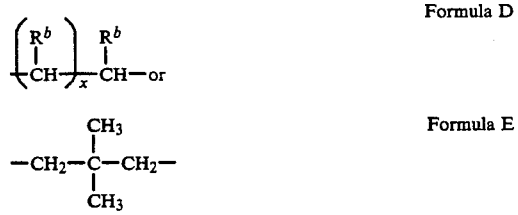

Formula D

Formula E wherein R, R', R", n and n" are defined as hereinbefore; A' and $R^a$ are divalent hydrocarbon groups having from 1 to about 6 carbon atoms; and $R^b$ is hydrogen or a hydrocarbyl group having from 1 to about 6 carbon atoms; x has a value suitably from 2 to about 19, more suitably from about 3 to about 10, most suitably from about 3 to about 5.

The glycidyl ethers of these compounds having an average of about two hydroxyl groups per molecule which hydroxyl groups are attached to an aliphatic or cycloaliphatic carbon atom and which compounds are

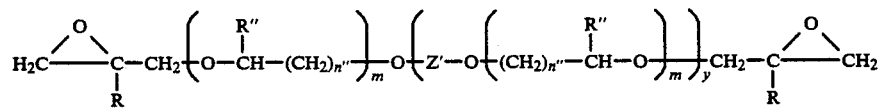

Formula VIII wherein R is as hereinbefore defined; R" is hydrogen, an alkyl group having suitably from 1 to 6, more suitably from 1 to 4, carbon atoms or a hydrocarbyl or hydrocarbyloxy group having from 1 to about 4 carbon atoms; each m is independently an integer suitably from zero to 25, more suitably from zero to 15, most suitably from zero to 10; n" has a value of 1 or 3, y has a value of zero or 1 and Z' is a divalent aliphatic or cycloaliphatic group having suitably from 2 to 20, more suitably from 2 to 15, carbon atoms or Z' is a group represented by the following Formulas A, B, C, D or E free of aromatic rings are produced by the condensation of an epihalohydrin with a diol represented by the following Formula IX:

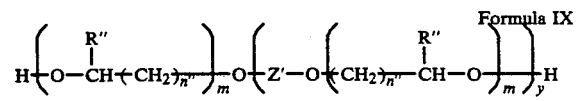

Formula IX wherein R", Z', n" and m are defined as hereinbefore. The resulting halohydrin product is then dehydrohalogenated by known methods with a basic acting substance, such as sodium hydroxide to produce the corresponding diglycidyl ether.

The oxyalkylated diols of Formula IX are produced by reacting a diol of the Formula X

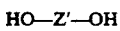 (Formula X)

wherein Z' is defined as hereinbefore, with the appropriate molar ratio of ethylene oxide, propylene oxide, butylene oxide, tetrahydrofuran, styrene oxide, an alkyl or aryl glycidyl ether or mixtures thereof. Examples of useful diols include, 1,3-cyclohexanediol, 1,4-cyclohexanediol, 1,4-cyclohexanedimethanol, hydrogenated bisphenol A, hydrogenated bisphenol F, butanediol, hexanediol, ethylene glycol, propylene glycol, neopentyl glycol, or mixtures thereof.

Suitable compounds which can be employed as the optional component (1aiii) include any compound which is different from components (1ai) and/or (1aii). Such compounds include, for example, diglycidyl ethers of compounds having two aromatic hydroxyl groups per molecule. Particularly suitable such compounds include those compounds described herein as being suitable for use as component (2). Particularly suitable such compounds include, for example, the diglycidyl ethers of bisphenol A, bisphenol AP, bisphenol F, combinations thereof and the like.

Some of the common methods of synthesis of the diglycidylethers of oxyalkylated diols produce significant amounts of organic chloride-containing impurities. However, other processes are known for preparing products with lower levels of such impurities. While the low-chloride resins are not required for the practice of this invention, they can be used, if desired, for possible improvements in the process of preparing the resins, in the storage properties of the resins or formulated coatings made therefrom or in the performance properties of the products.

Compounds containing two aromatic hydroxyl groups per molecule useful as components (1b) and component (3) are the same as those dihydric phenols useful for the production of the polyepoxides of component (2) as hereinbefore described. In practice, components (1b) and component (3) may be the same or different from each other and each may be the same or different from the dihydric phenol from which component (2) is prepared.

The use of capping agents provides the advantageous ability to reduce the epoxide content of the resulting product without chain-extension reactions and thus allows independent control of the average molecular weight and the epoxide content of the resulting resin within certain limits. Use of a monofunctional compound to terminate a certain portion of the resin chain ends also reduces the average epoxy functionality of the reaction product. The monofunctional compound is typically used at levels of zero to 0.7 equivalent of epoxy-reactive groups per equivalent of epoxy which would remain after reaction of substantially all of the aromatic hydroxyl groups of the compounds containing two aromatic hydroxyl groups per molecule.

Examples of useful monofunctional capping agents are monofunctional phenolic compounds such as phenol, tertiary-butyl phenol, cresol, para-nonyl phenol, higher alkyl substituted phenols; monofunctional carboxylic acids such as, for example, acetic acid, lactic acid, butyric acid, propionic acid or higher molecular weight mono acids; thiol compounds such as, for example, dodecyl mercaptan; combinations thereof and the like. Preferred as the capping agent is para-nonyl phenol. The total number of epoxy-reactive groups and the ratio of difunctional to monofunctional phenolic compounds, if any are used, are chosen so that there will be a stoichiometric excess of epoxide groups. Ratios are also chosen so that the resulting product will contain the desired concentration of terminal epoxy groups and the desired concentration of resin chain ends terminated by the monofunctional compound after substantially all of the epoxy-reactive groups are consumed by reaction with epoxy groups. The capping agent is employed in an amount of from zero to about 15, usually from about 1 to about 15, and more usually from about 2 to about 10 percent based on the total weight of the (1), (2), (3) and (4) components.

These amounts are dependent on the respective equivalent weights of the reactants and the relative amounts of the epoxy-functional components and can be calculated by methods known in the art. In the practice of this invention, the desired epoxide content of the reaction product useful for preparation of the cationic resin is typically between about 1 and about 8 percent, calculated as the weight percentage of oxirane groups, and preferably is from about 2 to about 6 percent and is most preferably from about 2 to about 4 percent. These levels are preferred because they provide, after conversion, the desired cationic charge density in the resinous products useful in cathodic electrodeposition. These cationic resins are produced by conversion of part or all of the epoxy groups to cationic groups as described below.

Reaction of the monofunctional compound with epoxy groups of the polyglycidylether components of the reaction mixture can be done prior to, substantially simultaneously with, or subsequent to the chain-extension reactions of the aromatic hydroxyl-containing product and the polyglycidylether components.

Reactions of the above components to produce the advanced epoxy resins are typically conducted by mixing the components and heating, usually in the presence of a suitable catalyst, to temperatures between 125° C. and 200° C., preferably between 150° C. and 180° C., until the desired epoxide content of the product is reached. The reaction can, optionally, be conducted in an appropriate solvent to reduce the viscosity, facilitate mixing and handling, and assist in controlling the heat of reaction.

Many useful catalysts for the desired reactions are known in the art. Examples of suitable catalysts include ethyltriphenylphosphonium acetate.acetic acid complex; ethyltriphenylphosphonium chloride, bromide, iodide, or phosphate; and tetrabutylphosphonium acetate.acetic acid complex. The catalysts are typically used at levels of from about 0.0001 to about 0.01 mole of catalyst per epoxide group.

Appropriate solvents include aromatic solvents, glycol ethers, glycol ether esters, high boiling esters or ketones, or mixtures. Other useful solvents will be apparent to those skilled in the art. Preferred solvents include, for example, xylene, ethylene glycol monobutylether and propylene glycol monophenylether. Solvent content can range from zero to 30 percent of the reaction mixture. A solvent is usually chosen which is compatible with the subsequent cation-forming reactions and with the final coating composition so that the solvent does not require subsequent removal or one that can be readily removed.

Unexpectedly, the two step preparation of the advanced epoxy resin provides an improvement in raising the electrodeposition rupture voltage and lowering the conductivity of the aqueous coating composition comprising advanced cationic resin(s) produced by the two step preparation and consequently improving the appearance of the coatings, especially at higher electrodeposition voltages, as compared to a one step preparation wherein components (1a), (1b), and (2) are reacted together simultaneously.

The nucleophilic compounds which are used advantageously in forming the cations required for forming the cationic resins in this invention are represented by the following classes of compounds, sometimes called Lewis bases:

(a) monobasic heteroaromatic nitrogen compounds;
(b) tetra (lower alkyl)thioureas;
(c) $R^1$—S—$R^2$ wherein $R^1$ and $R^2$ individually are lower alkyl, hydroxy lower alkyl or are combined as one divalent acyclic aliphatic radical having 3 to 5 carbon atoms;

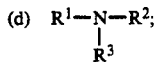

wherein $R^2$ and $R^3$ individually are lower alkyl, hydroxy lower alkyl,

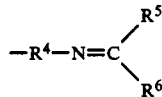

or are combined as one divalent acyclic aliphatic radical having from 3 to 5 carbon atoms, $R^4$ is a divalent acyclic aliphatic group having from 2 to 10 carbon atoms, $R^5$ and $R^6$ individually are lower alkyl and $R^1$ is hydrogen or lower alkyl, aralkyl or aryl, except that when $R^2$ and $R^3$ together are a divalent acyclic aliphatic group then $R^1$ is hydrogen, lower alkyl or hydroxyalkyl and when either or both of $R^2$ and $R^3$ is

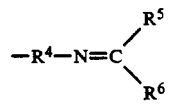

then $R^1$ is hydrogen; or

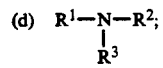

wherein $R^1$, $R^2$ and $R^3$ individually are lower alkyl, hydroxy lower alkyl or aryl.

In this specification the term lower alkyl means an alkyl having from 1 to 6 carbon atoms such as methyl, ethyl, propyl, isopropyl, n-butyl, isobutyl, n-pentyl, isopentyl, n-hexyl and isohexyl or branch chain isomers thereof.

Representative specific nucleophilic compounds are pyridine, nicotinamide, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethyl amine, diethyl amine, dibutyl amine, 2-(methylamino)ethanol, diethanolamine and the ketimine derivatives of polyamines containing secondary and primary amino groups such as those produced by the reaction of diethylene triamine or N-aminoethylpiperazine with acetone, methyl ethyl ketone or methylisobutyl ketone; N-methylpiperidine, N-ethylpyrrolidine, N-hydroxyethylpyrrolidine, trimethylphosphine, triethylphosphine, tri-n-butyl-phosphine, trimethylamine, triethylamine, tri-n-propylamine, triisobutylamine, hydroxyethyldimethylamine, butyldimethylamine, trihydroxyethylamine, triphenylphosphorus, and N,N,N-dimethylphenethylamine, methyldiethanolamine, dimethylethanolamine, any combination thereof and the like.

The nucleophilic compound is employed in an amount sufficient to convert at least a portion of the epoxy groups to cationic groups or cation-forming groups. When the nucleophilic compound is added to the epoxy-containing compound in the presence of an acid, a cationic group is formed. When the nucleophilic compound is added to the epoxy-containing compound in the absence of an acid, an adduct of the epoxy-containing compound and the nucleophilic compound is formed which is a cation-forming group which forms a cationic group when an acid is added.

Substantially any organic acid, especially a carboxylic acid, can be used in the conversion reaction to form onium salts so long as the acid is sufficiently strong to promote the reaction between the nucleophilic compound and the vicinal epoxide group(s) on the resinous reactant. In the case of the salts formed by addition of acid to a secondary amine-epoxy resin reaction product, the acid should be sufficiently strong to protonate the resultant amine product to the extent desired.

Monobasic acids are normally preferred ($H^{\oplus}A^{\ominus}$). Suitable organic acids include, for example, alkanoic acids having from 1 to 4 carbon atoms (e.g., acetic acid, formic acid, propionic acid, etc.), alkenoic acids having up to 5 carbon atoms (e.g., acrylic acid, methacrylic acid, etc.) hydroxy-functional carboxylic acids (e.g., glycolic acid, lactic acid, etc.) and organic sulfonic acids (e.g., methanesulfonic acid), and the like. Presently preferred acids are lower alkanoic acids of 1 to 4 carbon atoms with lactic acid and acetic acid being most preferred. The anion can be exchanged, of course, by conventional anion exchange techniques. See, for example, U.S. Pat. No. 3,959,106 at column 19. Suitable anions are bisulfate, bicarbonate, nitrate, dihydrogen phosphate, lactate and alkanoates of 1–4 carbon atoms. Acetate and lactate are the most preferred anions. Halide anions are usable, but are not preferred.

The conversion reaction to form cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from 25° C. to 100° C., with preferred reaction rates being observed at temperatures from 60° to 100° C.

Good results can be achieved by using substantially stoichiometric amounts of reactants although a slight excess or deficiency of the epoxy-containing resin or the nucleophilic compounds can be used. With weak acids, useful ratios of the reactants range from 0.5 to 1.0 equivalent of nucleophilic compounds per epoxide group of the resin and 0.4 to 1.1 equivalents of organic acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophilic compounds and the epoxy group of the resin. When the nucleophilic compounds is a secondary amine, the amine-epoxy reaction can be conducted first, followed by addition of the organic acid to form the salt and thus produce the cationic form of the resin. Larger excesses of amine can be used and the excess amine subsequently removed as known in the art such as by vacuum distillation, steam distillation, falling film distillation, and the like.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from 5 to 30 moles per epoxy equivalent. When the nucleophilic compound is a secondary amine, the water can be added before, during, or after the resin epoxy group/nucleophile reaction. The preferred range of charge density of the cationic, advanced epoxy resin is from 0.2 to 0.8 milliequivalent of charge per gram of the resin, calculated assuming complete salting of the limited reagent (acid or amine).

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included.

When a desired degree of reaction is reached, any excess nucleophilic compound can be removed by standard methods, e.g., dialysis, vacuum stripping and steam distillation.

The cationic, advanced epoxy resins of this invention in the form of aqueous dispersions are useful as coating compositions, especially when applied by electrodeposition. The coating compositions containing the cationic resins of this invention as the sole resinous component are useful but it is preferred to include crosslinking agents in the coating composition so that the coated films, when cured at elevated temperatures, will be crosslinked and exhibit improved film properties. The most useful sites on the resin for crosslinking reactions are the secondary hydroxyl groups along the resin backbone. Materials suitable for use as crosslinking agents are those known to react with hydroxyl groups and include blocked polyisocyanates; amine-aldehyde resins such as melamine-formaldehyde, urea-formaldehyde, benzoguanine-formaldehyde, and their alkylated analogs; polyester resins; and phenol-aldehyde resins.

Particularly useful and preferred crosslinking agents are the blocked polyisocyanates which, at elevated temperatures, react with the hydroxyl groups of the resin to crosslink the coating. Such crosslinkers are typically prepared by reaction of the polyisocyanate with a monofunctional active-hydrogen compound.

Examples of polyisocyanates suitable for preparation of the crosslinking agent are described in U.S. Pat. No. 3,959,106 to Bosso, et al., in Column 15, lines 1–24 which is incorporated herein by reference. Also suitable are isocyanate-functional prepolymers derived from polyisocyanates and polyols using excess isocyanate groups. Examples of suitable prepolymers are described by Bosso, et al., in U.S. Pat. No. 3,959,106, Column 15, lines 25–57. Additional suitable blocked polyisocyanates are described in U.S. Pat. No. 4,711,917 to McCollum et al. and European Patent Application 0.236,050 which are incorporated herein by reference in their entirety. In the preparation of the prepolymers, reactant functionality, equivalent ratios, and methods of contacting the reactants must be chosen in accordance with considerations known in the art to provide ungelled products having the desired functionality and equivalent weight.

Preferred polyisocyanates are the isocyanarate timer of hexamethylene diisocyanate, toluene diisocyanate, methylene diphenylene diisocyanate (MDI), polymeric MDI, isophorone diisocyanate and prepolymers of toluene diisocyanate or methylene diphenylene diisocyanate or the like with trimethylolpropane, dipropylene glycol, tripropylene glycol, other polyols or mixtures thereof.

Suitable blocking agents include alcohols, phenols, oximes, lactams, and N,N-dialkylamides or esters of alpha-hydroxyl group containing carboxylic acids. Examples of suitable blocking agents are described in U.S. Pat. No. 3,959,106 to Bosso, et al., in Column 15, line 58, through Column 16, line 6, and in U.S. Pat. No. 4,452,930 to Moriarity.

The blocked polyisocyanates are prepared by reacting equivalent amounts of the isocyanate and the blocking agent in an inert atmosphere such as nitrogen at temperatures between 25° to 100° C., preferably below 70° C. to control the exothermic reaction. Sufficient blocking agent is used so that the product contains no residual, free isocyanate groups. A solvent compatible with the reactants, product, and the coating composition can be used such as a ketone or an ester. A catalyst can also be employed such as dibutyl tin dilaurate.

The blocked polyisocyanate crosslinking agents are incorporated into the coating composition at levels corresponding to from 0.2 to 2.0 blocked isocyanate groups per hydroxyl group of the cationic resin. The preferred level is from about 0.3 to about 1 blocked isocyanate group per resin hydroxyl group.

A catalyst can, optionally, be included in the coating composition to provide faster or more complete curing of the coating. Suitable catalysts for the various classes of crosslinking agents are known to those skilled in the art. For the coating compositions using the blocked polyisocyanates as crosslinking agents, suitable catalysts include dibutyl tin dilaurate, dibutyl tin diacetate, dibutyl tin oxide, stannous octanoate, and other urethane-forming catalysts known in the art. Amounts used typically range between 0.1 and 3 weight percent of binder solids.

Unpigmented coating compositions are prepared by blending the cationic resinous product with the crosslinking agent and optionally any additives such as catalysts, solvents, surfactants, flow modifiers, plasticizers, defoamers, or other additives. This mixture is then dispersed in water by any of the known methods. A preferred method is the technique known as phase-inversion emulsification, wherein water is slowly added with agitation to the above mixture, usually at temperatures ranging from ambient to 70° C., until the phases invert to form an organic phase-in-water dispersion. The solids content of the aqueous dispersion is usually between 5 and 30 percent by weight and preferably between 10 and 25 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A pigment grinding vehicle suitable for use with this invention consists of a water-soluble cationic resinous product, water, and a minor amount of water-compatible solvent. The cationic resinous product is prepared by reacting an epichlorohydrin/bisphenol A condensation product having an epoxide group content of 8 percent with a nucleophilic compound, an acid, and water in a similar fashion as described above for the cationic resins used in the preferred embodiment of the invention. The water-soluble product can be diluted with water to form a clear solution useful as a pigment grinding vehicle.

The pH and/or conductivity of the coating compositions can be adjusted to desired levels by the addition of compatible acids, bases, and/or electrolytes known in the art. Other additives such as solvents, surfactants, defoamers, anti-oxidants, bactericides, etc. can also be added to modify or optimize properties of the compositions or the coating in accordance with practices known to those skilled in the art.

Although the coating compositions of the invention can be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage can range from 10 to 1,000 volts, typically 50 to 500. The film thickness achieved generally increases with increasing voltage. In the case of the coating compositions of the invention, suitable films may be achieved at higher voltages than for compositions using resins prepared by a one-step preparation. Current is allowed to flow for between a few seconds to several minutes, typically two minutes over which time the current usually decreases. Any electrically conductive substrate can be coated in this fashion, especially metals such as steel and aluminum. Other aspects of the electrodeposition process, such as bath maintenance, are conventional. After deposition, the article is removed from the bath and typically rinsed with water to remove that coating composition which does not adhere.

The uncured coating film on the article is cured by heating at elevated temperatures, ranging from 200° F. to 400° F. (93° C. to 204° C.), for periods of 1 to 60 minutes.

All of the coating compositions of the invention provide useful cathodically electrodepositable coatings having improved flowout, film build, and deposition properties and appearance due to use of the two-step preparation of the advanced epoxy resin composition.

The noncationic advanced resins of the present invention are useful in conventional solventborne coating compositions comprising epoxy resins of similar epoxide equivalent weight.

They can be formulated with any suitable curing agent for curing advanced epoxy resins either by reaction of the terminal epoxide groups or by the aliphatic hydroxyl groups pending from the chain which result from the reaction of the glycidyl ether groups with the phenolic hydroxyl groups during preparation of the advanced resin.

Any of the known curing agents for curing epoxy resins are suitable and include, polyamines, polyamides, polyisocyanates, blocked polyisocyanates, amino resins, phenolic resins, and polyesters and the like. Particularly suitable such curing agents for cathodic electrodeposition applications include, blocked polyisocyanates such as, for example, methylene diphenylene diisocyanate or isocyanate terminated prepolymers thereof which have been blocked with lower alkanols 1 to about 8 carbon atoms or glycol ethers having from about 3 to about 9 carbon atoms, isocyanate terminated toluene diisocyanate prepolymers blocked similarly to that described above, polymethylene polyphenylene isocyanate blocked similarly to that described above.

The following examples are illustrative of the invention, but are not to be construed as to limiting the scope thereof in any manner.

Blocked Isocyanate Crosslinker Solution A

An isocyanate terminated prepolymer of methylenediphenyl diisocyanate and a polypropylene glycol having a hydroxyl equivalent weight of about 80 and said prepolymer having an NCO equivalent weight of 181 in an amount of 1,955.6 g (10.8 eq) and xylene in an amount of 484.3 g are charged to a reactor and heated to 50° C. Acetone oxime in an amount of 788.7 g (10.8 eq) is then added as a solid in portions over a 75 minute period while maintaining the reaction temperature near 50° C. with cooling. During the final 30 minutes of the feed, the temperature is allowed to rise to 60° C. to decrease the viscosity of the mixture. After the feed is completed, 0.7 g of dibutyltin dilaurate is added and the reaction temperature raised to 70° C. over a 30 minute period. The mixture is reacted at 70° C. for 105 minutes, recovered, and poured into glass bottles for storage.

Blocked Isocyanate Crosslinker Solution B

Toluene diisocyanate (1363.1 g, 15.67 NCO equiv.) is charged to a 5 liter, round-bottomed flask equipped with a condenser, mechanical stirrer, nitrogen inlet, addition funnel and thermometer. The material is heated to 58° C. and a mixture of 308.9 g (1.45 OH equiv.) of polypropylene glycol of average molecular weight of 425 and 1.29 g of T-12 (dibutyltin dilaurate) catalyst is added dropwise with cooling to maintain 58°

C. An additional 523.5 g (2.46 OH equiv.) of the polypropylene glycol is added afterward. The total time for the two feeds is 140 minutes. 2-Ethylhexanol (1527.6 g, 11.75 OH equiv.) is then added over a period of 220 minutes at 58° C.-63° C. The reaction mixture is then heated at 73° C. for 45 minutes and the resulting blocked isocyanate crosslinker is a clear, viscous liquid at room temperature.

Pigment Grinding Vehicle A

Into a 5 liter, round-bottomed flask equipped with condenser, addition funnel, nitrogen inlet, mechanical stirrer, and thermometer is charged 920.5 g (4.90 eq) of a diglycidyl ether of bisphenol A having an EEW of 188 and 298.1 g (2.61 eq) bisphenol A. The mixture is heated under nitrogen to 85° C. and 1.44 g (2.46 eq) of a 70% solution of ethyl triphenylphosphonium acetate.acetic acid complex in methanol is added. The mixture is heated to 150° C. and allowed to exotherm to 184° C. The temperature is brought down to 175° C. and the reaction is maintained at 175° C. for one hour. The resin is cooled to 83° C. and diluted with 304.6 g methyl ethyl ketone. The solution is cooled to 65° C. and 167.5 g (2.23 eq) of N-methyl,2-aminoethanol is added over 19 minutes at 64° C.-70° C. The reaction is heated to 80° C.-84° C. for 65 minutes. The solution is then cooled to 75° C. and 276.8 g of 72.5% lactic acid solution (2.23 eq) in water is added. The mixture is then diluted with water to an approximately 40% non-volatile content to produce a clear, viscous solution.

Blocked Isocyanate Crosslinker Solution C

Methylenediphenylene diisocyanate (MDI) having 48% by weight content of 2,4' isomer and an isocyanate equivalent weight of 125.2 g/eq (10,746 g, 85.83 eq), methylisobutylketone (8,849 g) and dibutyltin dilaurate (15 g) are charged to a reactor and heated to 60° C. A mixture of dipropylene glycol (250 g, 3.73 eq), tripropylene glycol (350 g, 3.65 eq) and 2-butoxyethanol (9,340 g, 79.15 eq) is then added at a rate to keep the reaction below 70° C. After the addition is completed, the temperature is raised to 90° C. for 30 minutes. An infrared spectral analysis of the product showed no isocyanate present. After 30 minutes additional reaction time at 90° C., the product was transferred to containers and cooled.

Pigment Dispersion A

Into a one gallon, metal paint can is placed 698.0 g of pigment vehicle A, 108.3 g ASP 200 clay, 41.9 g EP202 lead silicate, 14.7 g Raven 410 carbon black, and 537.0 g R-900 titanium dioxide. A volume of about one-half the bulk pigment volume of chromeplated steel diagonals is added and the pigments are ground and dispersed by shaking the sealed paint can on a paint shaker. Water is added as the grinding progressed until a total of 186.0 g of water had been added. The diagonals are removed by passing the dispersion through a screen. The pigment dispersion contained 44.2% pigments by weight.

Pigment Dispersion B

Pigment Dispersion B is a commercially available pigment paste for cathodic electrodeposition available from PPG Industries, Inc., Automotive Electrocoat Office, Cleveland, Ohio under the designation E5994, ED-4 pigment paste. The product is 64% solids by weight, comprised of 11% resin vehicle and 53% pigment solids.

Surfactant Mixture A

A surfactant mixture known in the art is formed by mixing 80 g Ciba-Geigy Amine C, 80 g Air Products Surfynol 104, 105 g 2-butoxyethanol, 14.7 g acetic acid and 225 g water with heating to dissolve. The solution is filtered and then cooled to form a turbid, hazy solution.

EXAMPLE 1

A. Preparation of Advanced Epoxy Resin by two step procedure

A diglycidyl ether of dipropylene glycol having an epoxide equivalent weight (EEW) of 182.6 in an amount of 235.5 g (1.29 eq) and bisphenol A in an amount of 333.3 g (2.92 eq) are charged to a reactor, stirred under nitrogen and heated to 80° C. A 70% solution of tetrabutylphosphonium acetate.acetic acid complex in methanol in an amount of 2.3 g (5.07 meq) is added and the mixture heated to 175° C. The reaction is allowed to exotherm to 180° C. and then maintained at 175° C. for 30 minutes. The product is cooled to 150° C. and a diglycidyl ether of bisphenol A having an EEW of 187.6 in an amount of 549.6 g (2.93 eq) is added. The mixture cooled to 130° C. and is reheated to 175° C. for 58 minutes, then cooled. The epoxide equivalent weight at this point is found to be 943 g/eq.

B. Preparation of Cationic Resin

Xylene in an amount of 58.7 g is added to the product from A above and the solution cooled to 80° C. Diethanolamine in an amount of 124.4 g (1.18 eq) is added and the mixture reacted at 100° C. one hour. The product shows 0.913 meq base/g solids at 95.5% solids. This amine adduct solution in an amount of 237.0 g is blended with 142.9 g of blocked isocyanate crosslinker solution A at 59° C. and 4.9 g dibutyltin dilaurate catalyst is added. A solution of 22.8 g of 73.5% lactic acid in 46 g water is added dropwise at 64°-72° C., followed by dropwise addition of water at 56°-65° C. until inversion. The dispersion is cooled and diluted to 18% non-volatiles. A total of 1644.7 g water is used.

COMPARATIVE EXPERIMENT A

A. One step procedure for the preparation of an advanced epoxy resin

A diglycidyl ether of dipropylene glycol having an EEW of 182.2 in an amount of 539.2 g (2.96 eq), a diglycidyl ether of bisphenol A having a EEW of 187.5 in an amount of 1258.2 g (6.71 eq), and bisphenol A in an amount of 763.7 g (6.69 eq) are charged to a reactor and heated to 80° C. under nitrogen. A 70% solution of ethyltriphenylphosphonium acetate.acetic acid complex in methanol in an amount of 6.51 g (11.1 meq) is added and the mixture is heated to 150° C. The reaction is allowed to exotherm to 192° C., then controlled at 175° C. for 25 minutes. The reaction is then cooled to 150° C. for 45 minutes. The epoxide equivalent weight is 869 g/eq at this point.

B. Preparation of Cationic Resin

The product from A above is cooled to 135° C. and 133.3 g xylene is added. The solution is further cooled to 85° C., and diethanolamine (306.7 g, 2.92 eq) is added. The temperature rose to 105° C. and then the reaction is cooled to 95° C. for one hour. The product shows 0.978 meq base/g solids at 95.5% solids, as titrated with 0.1N HCl in methanol using tetrahydrofuran (THF) as solvent.

This amine adduct resin solution (235.8 g) is heated to 76° C. and 142.9 g of the blocked isocyanate crosslinker solution A at 75° C. is added. The two are mixed at 70° C. and 4.9 g dibutyltin dilaurate catalyst is added. A solution of 24.3 g of 73.5% lactic acid in 48.7 g water is then added dropwise over 12 minutes at 73°-76° C. Water is then added dropwise between 73° C. and 62° C. until inversion to form an aqueous dispersion of the resin is noted. The dispersion is then cooled and diluted to 18% non-volatile content with water. A total of 1644.3 g water is used.

EXAMPLE 2

A. Preparation of Advanced Epoxy Resin by two step procedure

A diglycidyl ether of dipropylene glycol having an EEW of 181.7 in an amount of 214.4 g (1.18 eq) and bisphenol A in an amount of 328.0 g (2.88 eq) are charged to a reactor and heated under nitrogen to 80° C. A 70% solution of ethyltriphenylphosphonium acetate.acetic acid complex in methanol (1.66 g, 2.83 meq) is added and the mixture is heated to 175° C. and held there for 30 minutes. The product is cooled to 150° C. and a diglycidyl ether of bisphenol A having an EEW of 187.4 in an amount of 500.3 g (2.67 eq) is added. The mixture cooled to 88° C. and an additional 0.82 g (1.4 meq) of the ethyltriphenylphosphonium acetate.acetic acid solution is added. The reaction mixture is reheated to 175° C. and maintained there for 29 minutes. The epoxide equivalent weight at this point is 1144 g/eq.

B. Preparation of Cationic Resin

The product from A above is cooled and diluted with 53.9 g of xylene. The solution is further cooled to 92° C. Diethanolamine (94.1 g, 0.895 eq) is then added and the reaction exothermed to 110° C. The reaction mixture is maintained between 100° and 110° C. for one hour. The product shows 0.768 meq base/g solids at 95.4% solids.

This amine adduct solution in an amount of 222.2 g is blended with 132.5 g of blocked isocyanate crosslinker A at about 70° C. and 4.4 g dibutyltin dilaurate catalyst is added. A solution of 18.0 g of 73.5% lactic acid in 36.2 g water is added dropwise with mixing. Water is then added dropwise between 61° C. and 67° C. until inversion. The dispersion is then cooled and diluted to 18% non-volatiles. A total of 1524.0 g water is used.

COMPARATIVE EXPERIMENT B

A. One step procedure for the preparation of an advanced epoxy resin

A diglycidyl ether of bisphenol A having an EEW of 187.4 in an amount of 500.3 g (2.67 eq), a diglycidyl ether of dipropylene glycol having an EEW of 181.7 in an amount of 214.4 g (1.18 eq), and bisphenol A in an amount of 328.0 g (2.88 eq) are charged to a reactor and heated under nitrogen to 80° C. A 70% solution of ethyltriphenylphosphonium acetate.acetic acid complex in methanol in an amount of 2.48 g (4.23 meq) is added and the mixture heated to 150° C. The reaction exothermed to 174° C. and is then maintained at 175° C. for 31 minutes. The epoxide equivalent weight is 1123 g/eq at this point.

B. Preparation of Cationic Resin

The resin from A above is cooled and 53.7 g xylene added. The solution is further cooled to 86° C. and 95.5 g (0.91 eq) of diethanolamine is added. The reaction mixture exothermed to 108° C. and is then controlled at 100° C. for one hour. The product shows 0.775 meq base/g solids at 95.5% solids.

This amine adduct solution in an amount of 221.5 g is blended with 132.2 g of blocked isocyanate crosslinker solution A at 67° C. and 4.6 g of dibutyltin dilaurate catalyst is added. A solution of 18.1 g of 73.5% lactic acid in 37.1 g water is added dropwise with mixing at 69° C.-73° C. Water is then added dropwise between 62° C. and 69° C. until inversion. The aqueous dispersion is cooled and diluted to 18% non-volatiles. A total of 1522.5 g of water is used.

EXAMPLE 3

The aqueous resin dispersions from Examples 1 and 2 and the Comparative Experiments A and B are pigmented by adding, with continuous stirring, an appropriate amount of Pigment Dispersion A to yield a pigment to binder weight ratio of 0.2, with binder counted as the solids in the resin dispersion and pigment vehicle. The pigmented dispersion served as the coating bath for electrodeposition.

Pretreated (Bonderite 40), unpolished cold rolled steel test panels are suspended in the bath and are electrocoated by application of the desired D.C. voltage between the panel and the steel container (serving as the anode). Coating is done at 80° F. with the bath continually stirred. The voltage is typically applied in ramp fashion from zero volts up to coating voltage over 15-30 seconds. Voltage is applied for a total of two minutes. After coating, excess bath is rinsed from the panels by a gentle stream of deionized water. The panels are cured by baking in an electric forced convection oven at 135° C. for 15 minutes.

Results of electrodeposition coating of the coating baths made from the examples and the Comparative Experiments are summarized in Table I.

The results in Table I show the higher rupture voltages obtained using resins made by the two-step advancement process of the present invention as compared to the one step process. The resins prepared by the two-step process also gave better appearance in each case.

TABLE I

| | Coating Designation | | |
|---|---|---|---|
| | A | B | C* |
| Cationic Resin employed | Ex. 1 | Ex. 2 | C. E. B |
| EEW of Advanced Resin from which the Cationic Resin was made | 943 | 1144 | 1123 |
| Rupture Voltage$^a$ | 225 | 275 | 150 |
| Coating thickness | | | |
| mils (volts) | 0.2 (75) | 0.29 (150) | 0.63 (125) |
| mm (volts) | 0.0051 (75) | 0.0074 (150) | 0.016 (125) |
| Coating thickness | | | |
| mils (volts) | 0.39 (200) | 0.5 (250) | — |
| mm (volts) | 0.01 (200) | 0.013 (250) | — |
| Coating | Fair | Good | Poor |

TABLE I-continued

| | Coating Designation | | |
|---|---|---|---|
| | A | B | C* |
| Appearance | | | 5 |

*Not an example of the present invention.
"Rupture voltage is the voltage at which electrodeposition becomes uncontrolled and excessive gassing and deposition take place, due to lack of current cutoff as the deposit builds.

EXAMPLE 4

Into a 2 liter, round bottomed flask fitted with nitrogen inlet, mechanical stirrer, condenser, and thermometer is charged 88.9 g (0.494 equiv.) of a diglycidyl ether of bisphenol A epoxy resin having an epoxide equivalent weight of 180, 66.3 g (0.202 equiv.) of a product which is substantially the diglycidyl ether of an adduct of four moles of ethylene oxide and one mole of bisphenol A (epoxide equivalent weight of 328, prepared by treating the adduct of bisphenol A and ethylene oxide with epichlorohydrin in the presence of Lewis acid catalyst, followed by treatment with sodium hydroxide), and 336.6 g (2.95 equiv.) bisphenol A. The mixture is heated to 70° C. and 1.41 g of a 47 percent solution of ethyltriphenyl phosphonium phosphate in methanol is added. The mixture is heated to 180° C. for three hours. The resin is cooled to 120° C. and 509 g (2.83 equiv.) of a diglycidyl ether of bisphenol A having an EEW of 180 is added. The mixture is heated to 180° C. and held at that temperature for two hours. The epoxide equivalent weight of the resultant product is 1954. The resin is cooled and diluted with propylene glycol methyl ether to 80 percent non-volatile content by weight.

This resin solution (263.6 g resin solution, 210.88 g of neat resin, 0.108 equiv.) is heated under nitrogen to 85° C. and 8.07 g (0.108 equiv.) of 2-(methylamino)ethanol is added. The reaction mixture is maintained at 82° to 85° C. for one hour. Blocked isocyanate Crosslinker Solution B (94.7 g), T-12 (dibutyltin dilaurate) catalyst (4.8 g), and 72.9 percent lactic acid solution (10.7 g, 0.087 equiv.) mixed with 11.7 g water are added sequentially and mixed. Water is added dropwise over a period of 3 hours at temperatures between 82° and 60° C. until the mixture inverted to form an aqueous dispersion. The dispersion is then cooled and further diluted with water to a non-volatile content of 18 percent.

The aqueous dispersion (1,803.9 g) is pigmented with 172.0 g of pigment dispersion A. The coating composition is placed in a stainless steel tank, agitated, and maintained at 80° F. (27° C.). Unpolished steel test panels having Bonderite ™ 40 treatment and P60 rinse (available from Advanced Coating Technologies, Inc.) are immersed in the tank and connected as the cathode to a D.C. voltage source, with the tank walls serving as the anode. The desired voltage is applied for two minutes, then the panels are removed, rinsed with deionized water, and baked at the 177° C. for 30 minutes. The resulting film thicknesses at the indicated voltage are given in Table II.

TABLE II

| Deposition Voltage | Film Thickness, mil (mm) |
|---|---|
| 200 | 0.16 (0.00410) |
| 225 | 0.19 (0.00480) |
| 250 | 0.21 (0.00530) |
| 275 | 0.23 (0.0058) |
| 300 | 0.27 (0.0069) |
| 350 | 0.34 (0.0086) |

EXAMPLE 5

A. Preparation of Advanced Epoxy Resin by Two Step Procedure

A diglycidyl ether of an adduct of one mole bisphenol A and about 3.4 moles (per mole bisphenol A on the average) propylene oxide having an epoxide equivalent weight (EEW) of 341 g/eq and containing 2.99 wt % total chlorides (272.2 g, 0.798 eq), bisphenol A (232.7 g, 2.04 eq) and 45.0 g xylene are charged to a reactor and heated under nitrogen to 88° C. A 70% solution of ethyltriphenylphosphonium acetate.acetic acid complex in methanol (1.19 g, 2.03 meq) is added and the mixture is heated to 175° C. and held there for 30 minutes. The product is cooled to below 150° C. and a diglycidyl ether of bisphenol A having an EEW of 188 g/eq (395.1 g, 2.10 eq) is added. The mixture cooled to 108° C. The reaction mixture is reheated to 175° C. and maintained there for 68 minutes. The epoxide equivalent weight (EEW) at this point is 1059 g/eq, based on non-volatiles.

B. Preparation of Cationic Resin

The above product is cooled to below 115° C. and 276.9 g methylisobutylketone is added. The solution is further cooled to 96° C. Diethanolamine at 1 eq/eq epoxide in the reactor (87.5 g, 0.833 eq) is then added and the reaction exothermed to 108° C. The reaction mixture is then maintained at 100° C. for two hours. The product showed 0.816 meq base/g solids at 79.4% solids.

A portion of this amine adduct solution (250 g of solids) is blended with 142.9 g of blocked isocyanate crosslinker solution C at ambient temperature. Propylene glycol phenyl ether (10.5 g), Surfactant Mixture A (5.6 g) and acetic acid (0.8 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen.

EXAMPLE 6

A. Preparation of Advanced Epoxy Resin by Two Step Procedure

A diglycidyl ether of an adduct of one mole bisphenol A and about 6 moles (per mole bisphenol A on the average) ethylene oxide having an epoxide equivalent weight of 366 g/eq (292.1 g, 0.798 eq), bisphenol A (225.2 g, 1.98 eq) and 45.0 g xylene are charged to a reactor and heated under nitrogen to 90° C. A 70% solution of ethyltriphenylphosphonium acetate.acetic acid complex in methanol (1.16 g, 1.98 meq) is added and the mixture is heated to 175° C. and held there for 30 minutes. The product is cooled to below 150° C. and a diglycidyl ether of bisphenol A having an EEW of 188 g/eq (382.7 g, 2.04 eq) is added. The mixture cooled to 107° C. The reaction mixture is reheated to 175° C. and maintained there for 81 minutes. The epoxide equivalent weight (EEW) at this point is 1086 g/eq, based on non-volatiles.

B. Preparation of Cationic Resin

The above product is cooled to below 115° C. and 283.8 g methylisobutylketone (MIBK) is added. The solution is further cooled to 93° C. Diethanolamine at 1 eq/eq epoxide in the reactor (85.1 g, 0.810 eq) is then added and the reaction exothermed to 103° C. The reaction mixture is then maintained at 100° C. for two hours. The product showed 0.784 meq base/g solids at 77.9% solids.

A portion of this amine adduct solution (250 g of solids) is blended with 142.9 g of blocked isocyanate crosslinker solution C at ambient temperature. Propylene glycol phenyl ether (10.5 g), surfactant mixture A (5.6 g) and acetic acid (0.85 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen. After evaporation, the dispersion at 35% non-volatiles is viscous. MIBK (114 g), acetic acid (1.18 g, corresponding to an additional 0.1 eq/eq base in the amine adduct resin) and water (800 g) are added and the dispersion stirred vigorously for two hours. The solvent is again removed by evaporation. The resulting dispersion is low in viscosity and stable.

EXAMPLE 7

A. Preparation of Advanced Epoxy Resin by Two Step

A diglycidyl ether of an adduct of one mole bisphenol A and about 3.4 moles (per mole bisphenol A on the average) propylene oxide having an epoxide equivalent weight of 392 g/eq and containing about 145 ppm by weight total chlorine (calculated as chloride) (225.9 g, 0.576 eq), bisphenol A (157.0 g, 1.38 eq) and 32.5 g xylene are charged to a reactor and heated under nitrogen to 92° C. A 70% solution of ethyltriphenylphosphonium acetate.acetic acid complex in methanol (0.82 g, 1.4 meq) is added and the mixture is heated to 175° C. and held there for 30 minutes. The product is cooled to below 150° C. and a diglycidyl ether of bisphenol A having an EEW of 188 g/eq (274.1 g, 1.46 eq) is added. The mixture cooled to 110° C. The reaction mixture is reheated to 175° C. and maintained there for 111 minutes. The reaction mixture is cooled to 123° C. and 0.2 g (0.34 meq) of the phosphonium solution above is added. The mixture is reheated to 175° C. and reacted 62 minutes. The epoxide equivalent weight (EEW) at this point is 1029 g/eq, based on non-volatiles.

B. Preparation of Cationic Resin

The above product is cooled to below 115° C. and 209.0 g methylisobutylketone is added. The solution is further cooled to ambient temperature. Later, the solution is reheated to 90° C. Diethanolamine at 1 eq/eq epoxide in the reactor (65.1 g, 0.62 eq) is then added and the reaction exothermed to 97° C. The reaction mixture is then maintained at 100° C. for two hours. The product showed 0.859 meq base/g solids at 76.9% solids.

A portion of this amine adduct solution (250 g of solids) is blended with 142.9 g of blocked isocyanate crosslinker solution C at ambient temperature. Propylene glycol phenyl ether (10.5 g), surfactant mixture A (5.6 g) and acetic acid (0.8 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen.

EXAMPLE 8

A. Preparation of Advanced Epoxy Resin by Two Step Procedure

A diglycidyl ether of an adduct of one mole bisphenol A and about 3.4 moles (per mole bisphenol A on the average) propylene oxide having an epoxide equivalent weight of 341 g/eq and containing 2.99 wt % total chlorides (272.2 g, 0.798 eq), bisphenol A (136.4 g, 1.20 eq) and 45.0 g xylene are charged to a reactor and heated under nitrogen to 92° C. A 70% solution of ethyltriphenylphosphonium acetate.acetic acid complex in methanol (1.19 g, 2.03 meq) is added and the mixture is heated to 175° C. and held there for 52 minutes. The product is cooled to below 150° C. and a diglycidyl ether of bisphenol A having an EEW of 188 g/eq (401.5 g, 2.14 eq) and bisphenol A (96.3 g, 0.845 eq) is added. The mixture cooled to 94° C. The reaction mixture is reheated to 175° C. and maintained there for 60 minutes. The epoxide equivalent weight (EEW) at this point is 1029 g/eq, based on non-volatiles.

B. Preparation of Cationic Resin

The above product is cooled to below 115° C. and 281.1 g methylisobutylketone is added. The solution is further cooled to 92° C. Diethanolamine at 1 eq/eq epoxide in the reactor (89.6 g, 0.853 eq) is then added and the reaction exothermed to 100° C. The reaction mixture is then maintained at 100° C. for two hours. The product showed 0.820 meq base/g solids at 79.3% solids.

A portion of this amine adduct solution (250 g of solids) is blended with 142.9 g of blocked isocyanate crosslinker solution C at ambient temperature. Propylene glycol phenyl ether (10.5 g), surfactant mixture A (5.6 g) and acetic acid (0.85 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen.

EXAMPLE 9

A. Preparation of Advanced Epoxy Resin by Two Step Procedure

A diglycidyl ether of an adduct of one mole bisphenol A and about 3.4 moles (per mole bisphenol A on the average) propylene oxide having an epoxide equivalent weight of 341 g/eq and containing 2.99 wt % total chlorides (272.2 g, 0.798 eq), bisphenol A (111.2 g, 0.975 eq) and 45.0 g xylene are charged to a reactor and heated under nitrogen to 96° C. A 70% solution of ethyltriphenylphosphonium acetate.acetic acid complex in methanol (1.19 g, 2.03 meq) is added and the mixture is heated to 175° C. and held there for 62 minutes. The product is cooled to below 150° C. and a diglycidyl ether of bisphenol A having an EEW of 188 g/eq (397.6 g, 2.11 eq) and bisphenol A (121.5 g, 1.07 eq) is added. The mixture cooled to 85° C. The reaction mixture is reheated to 175° C. and maintained there for 128 minutes. The epoxide equivalent weight (EEW) at this point is 1019 g/eq, based on non-volatiles.

B. Preparation of Cationic Resin

The above product is cooled to below 115° C. and 282.0 g methylisobutylketone is added. The solution is further cooled to 92° C. Diethanolamine at 1 eq/eq epoxide in the reactor (90.0 g, 0.857 eq) is then added and the reaction exothermed to 100° C. The reaction mixture is then maintained at 95° C. for one hour and then 100° C. for one hour. The product showed 0.822 meq base/g solids at 78.7% solids.

A portion of this amine adduct solution (250 g of solids) is blended with 142.9 g of blocked isocyanate crosslinker solution C at ambient temperature. Propylene glycol phenyl ether (10.5 g), surfactant mixture A (5.6 g) and acetic acid (0.85 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen.

EXAMPLE 10

A. Preparation of Advanced Epoxy Resin by Two Step Procedure

A diglycidyl ether of an adduct of one mole bisphenol A and about 3.4 moles (per mole bisphenol A on the average) propylene oxide having an epoxide equivalent weight of 341 g/eq and containing 2.99 wt % total chlorides (272.2 g, 0.798 eq) and bisphenol A (232.7 g, 2.04 eq) are charged to a reactor and heated under nitrogen to 100° C. A 70% solution of ethyltriphenylphosphonium acetate.acetic acid complex in methanol (1.18 g, 2.01 meq) is added and the mixture is heated to 175° C. and held there for 42 minutes. The product is cooled to below 150° C. and a diglycidyl ether of bisphenol A having an EEW of 188 g/eq (402.6 g, 2.14 eq) and bisphenol A (4.5 g, 0.0395 eq) are added. The mixture cooled to 111° C. The reaction mixture is reheated to 175° C. and maintained there for 95 minutes. The epoxide equivalent weight (EEW) at this point is 1051 g/eq.

B. Preparation of Cationic Resin

The above product is cooled to below 115° C. and 280.0 g methylisobutylketone and 44.2 g xylene are added. The solution is further cooled to 93° C. Diethanolamine at 1 eq/eq epoxide in the reactor (88.3 g, 0.841 eq) is then added and the reaction exothermed to 102° C. The reaction mixture is then maintained at 100° C. for two hours. The product showed 0.856 meq base/g solids at 76.5% solids.

A portion of this amine adduct solution (250 g of solids) is blended with 142.9 g of blocked isocyanate crosslinker solution C at ambient temperature. Propylene glycol phenyl ether (10.5 g), surfactant mixture A (5.6 g) and acetic acid (0.85 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen.

COMPARATIVE EXPERIMENT C

A. Preparation of Advanced Epoxy Resin by One Step Procedure

A diglycidyl ether of an adduct of one mole bisphenol A and about 3.4 moles (per mole bisphenol A on the average) propylene oxide having an epoxide equivalent weight of 341 g/eq and containing 2.99 wt % total chlorides (727.0 g, 2.13 eq), bisphenol A (621.8 g, 5.45 eq) and a diglycidyl ether of bisphenol A having an EEW of 188 (1054.8 g, 5.61 eq) are charged to a reactor and heated under nitrogen to 91° C. A 70% solution of ethyltriphenylphosphonium acetate.acetic acid complex in methanol (5.4 g, 9.22 meq) is added and the mixture is heated to 175° C. and held there for 75 minutes. The product is cooled to below 115° C. and 120.2 g xylene and 762.8 g methylisobutylketone are added. The epoxide equivalent weight (EEW) at this point is 1029 g/eq, based on non-volatiles.

B. Preparation of Cationic Resin

The above solution is cooled to 95° C. and diethanolamine at 1 eq/eq epoxide in the reactor (245.3 g, 2.34 eq) is then added and the reaction exothermed to 104° C. The reaction mixture is then maintained at 100° C. for two hours. The product showed 0.794 meq base/g solids at 78.5% solids.

A portion of this amine adduct solution (250 g of solids) is blended with 142.9 g of blocked isocyanate crosslinker solution C at ambient temperature. Propylene glycol phenyl ether (10.5 g), surfactant mixture A (5.6 g) and acetic acid (0.85 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen.

COMPARATIVE EXPERIMENT D

A. Preparation of Advanced Epoxy Resin by One Step Procedure

A diglycidyl ether of an adduct of one mole bisphenol A and about 6 moles (per mole bisphenol A on the average) ethylene oxide having an epoxide equivalent weight of 366 g/eq (292.1 g, 0.798 eq), bisphenol A (225.2 g, 1.98 eq), a diglycidyl ether of bisphenol A having an EEW of 188 (382.7 g, 2.04 eq) and 45.0 g xylene are charged to a reactor and heated under nitrogen to 90° C. A 70% solution of ethyltriphenylphosphonium acetate.acetic acid complex in methanol (1.99 g, 3.40 meq) is added and the mixture is heated to 175° C. and held there for 80 minutes. The product is cooled to below 115° C. and 287.1 g methylisobutylketone is added. The epoxide equivalent weight (EEW) at this point is 1062 g/eq, based on non-volatiles.

B. Preparation of Cationic Resin

The above solution is cooled to 92° C. and diethanolamine at 1 eq/eq epoxide in the reactor (86.8 g, 0.827 eq) is then added and the reaction exothermed to 98° C. The reaction mixture is then maintained at 100° C. for two hours. The product showed 0.790 meq base/g solids at 78.9% solids.

A portion of this amine adduct solution (250 g of solids) is blended with 142.9 g of blocked isocyanate crosslinker solution C at ambient temperature. Propylene glycol phenyl ether (10.5 g), surfactant mixture A (5.6 g) and acetic acid (0.8 eq/eq base in the amine adduct) are then added and mixed. Water is then added dropwise until inversion. The dispersion is then diluted to 30-35% non-volatiles with water. The methylisobutylketone and xylene are evaporated out of the aqueous dispersion by stirring two days under a gentle stream of nitrogen.

COMPARATIVE EXPERIMENT E

A. Preparation of Advanced Epoxy Resin by One Step Procedure

A diglycidyl ether of an adduct of one mole bisphenol A and about 3.4 moles (per mole bisphenol A on the average) propylene oxide having an epoxide equivalent weight of 392 g/eq and containing 145 ppm by weight of total chlorides (225.9 g, 0.576 eq), bisphenol A (157.0 g, 1.38 eq), a diglycidyl ether of bisphenol A having an EEW of 188 (267.1 g, 1.42 eq) and 32.5 g xylene are charged to a reactor and heated under nitrogen to 94° C. A 70% solution of ethyltriphenylphosphonium acetate.acetic acid complex in methanol (1.40 g, 2.39 meq) is added and the mixture is heated to 175° C. and held there for 195 minutes. The product is cooled to 122° C. and 0.4 g (0.68 meq) of the above phosphonium solution is added. The reaction mixture is reheated to 175° C. and maintained there for 81 minutes. The epoxide equivalent weight (EEW) at this point is 1057 g/eq, based on non-volatiles. The solution is cooled to 115° C. and 207.0 g methylisobutylketone is added. The solution is cooled to ambient temperature.

B. Preparation of Cationic Resin

The above solution is heated to 90° C. and diethanolamine at 1 eq/eq epoxide in the reactor (62.8 g, 0.598 eq) is then added and the reaction exothermed to 99° C. The reaction mixture is then maintained at 100° C. for two hours. The product showed 0.829 meq base/g solids at 77.2% solids.

A portion of this amine adduct solution (250 g of solids) is blended with 142.9 g of blocked isocyanate crosslinker solution C at ambient temperature. Propylene glycol phenyl ether (10.5 g), Surfactant Mixture A (5.6 g) and acetic acid (0.8 eq/eq base in the amine adduct) are then added and mixed. Water is then added dropwise until inversion. The dispersion is then diluted to 30-35% non-volatiles with water. The methylisobutylketone and xylene are evaporated out of the aqueous dispersion by stirring two days under a gentle stream of nitrogen.

EXAMPLE 11

The aqueous resin dispersions from Examples 5-10 and Comparative Experiments C-E are diluted to 18% non-volatiles and filtered. The dispersions are then pigmented by adding, with continuous stirring, an appropriate amount of Pigment Dispersion B to yield a pigment-to-binder weight ratio of 0.3, with binder counted as the solids in the resin dispersion and pigment vehicle. The pigmented dispersion is stirred overnight, filtered and then used as the coating bath for electrodeposition. Test panels are coated as described in Example 3. The panels are cured at 177° C. for thirty minutes. Results of electrodeposition coating of the coating baths made from the examples and the comparative experiments are summarized in Tables III, IV and V.

Table III shows data for the systems using the 3.4 mole ratio of propylene oxide, Table IV for the 6 mole ratio ethylene oxide, and Table V for the low chloride version of the 3.4 mole ratio of propylene oxide. In all cases, materials of the invention using the two-step preparation of the advanced epoxy resin give equal or greater rupture voltage, film thickness, and/or coulombic efficiency than the comparative experiments using the one step preparation of the advanced epoxy resin. This finding is true even for the systems where the dispersion conductivity for the materials of the invention are higher, a condition for which rupture voltage and coulombic efficiency normally decline.

TABLE III

| | Coating Designation | | | | |
|---|---|---|---|---|---|
| | A | B | C | D | E* |
| Cationic Resin Employed | Ex. 5 | Ex. 8 | Ex. 9 | Ex. 10 | C. E. C[c] |
| Dispersion Conductivity[a] | 1,890 | 2,130 | 2,220 | 2,130 | 2,010 |
| Rupture Voltage | 300 | 275 | 275 | 275 | 275 |
| Coating Thickness at 225 V | | | | | |
| mils | 0.44 | 0.43 | 0.45 | 0.48 | 0.45 |
| mm | 0.011 | 0.011 | 0.011 | 0.012 | 0.011 |
| Coating Thickness at 250 V | | | | | |
| mils | 0.50 | 0.54 | 0.57 | 0.59 | 0.54 |
| mm | 0.013 | 0.014 | 0.014 | 0.015 | 0.014 |
| Coulombic efficiency[b] at | | | | | |
| 200 volts | 59 | 48 | 44 | 52 | 43 |
| 225 volts | 66 | 51 | 52 | 55 | 49 |
| 250 volts | 65 | 55 | 61 | 61 | 55 |
| 275 volts | 68 | — | — | — | — |

*Not an example of the present invention.
[a]In micromho/cm; for unpigmented dispersion at 18% non-volatiles.
[b]Expressed as volume cured coating per coulombs measured using proportional counter ((inches of panel coated × thickness) ÷ proportional amp-time count).
[c]Comparative Experiment C.

TABLE IV

| | Coating Designation | |
|---|---|---|
| | A | E* |
| Cationic Resin Employed | Ex. 6 | C. E. D[c] |
| Dispersion Conductivity[a] | 1,900 | 2,090 |
| Rupture Voltage | 300 | 275 |
| Coating Thickness at 225 V | | |
| mils | 0.44 | 0.45 |
| mm | 0.011 | 0.011 |
| Coating Thickness at 250 V | | |
| mils | 0.92 | 0.81 |
| mm | 0.023 | 0.021 |
| Coulombic efficiency[b] at | | |
| 200 volts | 61 | 57 |
| 225 volts | 69 | 67 |
| 250 volts | 74 | 69 |
| 275 volts | 80 | — |

*Not an example of the present invention.
[a]In micromho/cm; for unpigmented dispersion at 18% non-volatiles.
[b]Expressed as volume cured coating per coulombs measured using proportional counter ((inches of panel coated × thickness) ÷ proportional amp-time count).
[c]Comparative Experiment D.

TABLE V

| | Coating Designation | |
|---|---|---|
| | A | E* |
| Cationic Resin Employed | Ex. 7 | C. E. E[c] |
| Dispersion Conductivity[a] | 2,140 | 2,025 |

TABLE V-continued

| | Coating Designation | |
|---|---|---|
| | A | E* |
| Rupture Voltage | 275 | 250 |
| Coating Thickness at 225 V | | |
| mils | 0.75 | 0.63 |
| mm | 0.019 | 0.016 |
| Coating Thickness at 250 V | | |
| mils | 1.10 | — |
| mm | 0.028 | — |
| Coulombic efficiency[b] at | | |
| 200 volts | 60 | 57 |
| 225 volts | 74 | 63 |
| 250 volts | 83 | — |
| 275 volts | — | — |

*Not an example of the present invention.
[a]In micromho/cm; for unpigmented dispersion at 18% non-volatiles.
[b]Expressed as volume cured coating per coulombs measured using proportional counter ((inches of panel coated × thickness) ÷ proportional amp-time count).
[c]Comparative Experiment E.

What is claimed is:

1. A curable composition comprising a curing quantity of a suitable curing agent and a composition comprising a mixture of
   (A) an advanced epoxy resin resulting from reacting a composition comprising
      (1) the aromatic hydroxyl-containing product resulting from reacting a composition comprising
         (a) at least one diglycidyl ether of (i) an oxyalkylated aromatic diol, or (ii) at least one compound having two hydroxyl groups per molecule in which the hydroxyl groups are attached to an aliphatic or cycloaliphatic carbon atom and which compound is free of aromatic rings; or (iii) a combination of (i) and (ii); and (iv) optionally, a diglycidyl ether compound different from (i) and (ii) which is present in an amount such that the amount of epoxy groups contributed by component (iv) based upon the total amount of epoxy groups contributed by components (i), (ii) and (iv) is from about zero to about 75 percent; and
         (b) at least one compound containing two aromatic hydroxyl groups per molecule; wherein components (a) and (b) are employed in amounts such that there are more aromatic hydroxyl groups present than glycidyl ether groups;
      (2) at least one diglycidyl ether of a compound containing two aromatic hydroxyl groups per molecule;
      (3) optionally, one or more compounds containing two aromatic hydroxyl groups per molecule; and
      (4) optionally, a monofunctional capping agent; and
   (B) at least one diglycidyl ether of a compound having two aromatic hydroxyl groups per molecule;
   wherein components (A1) and (A2) are employed in amounts such that the resultant product has an epoxide equivalent weight greater than that of component (A2); component (A3), when present, is employed in an amount which provides a total amount of aromatic hydroxyl groups from components (A1) and (A3) per epoxide group contained in component (A2) of from about 0.5:1 to about 0.95:1; and component (A4) is present in an amount which provides a ratio of epoxy-reactive groups contained in component (A4) per glycidyl group not consumed by reaction of components (A1) and (A3) with component (A2) of from about zero:1 to about 0.7:1; and components (A) and (B) are present in an amount such that from about 25 to about 95 percent of the total amount of glycidyl ether groups are contributed by component (A) and from about 75 to about 5 percent of the total amount of glycidyl ether groups are contributed by component (B).

2. A curable composition of claim 1 wherein
   (i) components (A1a) and (A1b) are employed in amounts which provide a ratio of aromatic hydroxyl groups to epoxy groups of from about 1.05:1 to about 10:1;
   (ii) components (A1) and (A2) are employed in amounts which provide a ratio of aromatic hydroxyl groups to epoxy groups of from about 0.01:1 to about 0.95:1;
   (iii) component (A3), when present, is employed in an amount which provides a total amount of aromatic hydroxyl groups from components (A1) and (A3) per epoxide group contained in component (A2) of from about 0.5:1 to about 0.9:1; and
   (iv) component (A4), when present, is employed in an amount which provides a ratio of epoxy-reactive groups contained in component (A4) per glycidyl group not consumed by reaction of components (A1) and (A3) with component (A2) of from about 0.1:1 to about 0.7:1; and
   (v) components (A) and (B) are present in an amount such that from about 25 to about 75 percent of the total amount of glycidyl ether groups are contributed by component (A) and from about 25 to about 75 percent of the total amount of glycidyl ether groups are contributed by component (B).

3. A curable composition of claim 1 wherein
   (i) components (A1a) and (A1b) are employed in amounts which provide a ratio of aromatic hydroxyl groups to epoxy groups of from about 1.1:1 to about 7.5:1;
   (ii) components (A1) and (A2) are employed in amounts which provide a ratio of aromatic hydroxyl groups to epoxy groups of from about 0.05:1 to about 0.9:1;
   (iii) component (A3), when present, is employed in an amount which provides a total amount of aromatic hydroxyl groups from components (A1) and (A3) per epoxide group contained in component (A2) of from about 0.55:1 to about 0.8:1;
   (iv) component (A4), when present, is employed in an amount which provides a ratio of epoxy-reactive groups contained in component (A4) per glycidyl group not consumed by reaction of components (A1) and (A3) with component (A2) of from about 0.2:1 to about 0.5:1; and
   (v) components (A) and (B) are present in an amount such that from about 25 to about 50 percent of the total amount of glycidyl ether groups are contributed by component (A) and from about 75 to about 50 percent of the total amount of glycidyl ether groups are contributed by component (B).

4. A curable composition of claim 3 wherein
   (i) components (A1a) and (A1b) are employed in amounts which provide a ratio of aromatic hydroxyl groups to epoxy groups of from about 1.2:1 to about 6:1;
   (ii) components (A1) and (A2) are employed in amounts which provide a ratio of aromatic hydroxyl groups to epoxy groups of from about 0.08:1 to about 0.8:1; and (iii) components (A) and (B) are present in an amount such that from about 25 to about 50 percent of the total amount of glycidyl ether groups are contributed by component (A) and from about 75 to about 50 percent of the total amount of glycidyl ether groups are contributed by component (B).

5. A curable composition of claim 1, 2, 3 or 4 wherein
(i) component (A1a) is one or more compounds represent by the following Formula V wherein each R is independently hydrogen or a hydrocarbyl group having from 1 to 4 carbon atoms; R" is hydrogen, an hydrocarbyl group having from 1 to 6 carbon atoms or a hydrocarbyloxy group having from 1 to about 4 carbon atoms; each m is independently an integer from 1 to 25; and Z is a group represented by the following Formulas A, B, C or D:

pendently hydrogen or a hydrocarbyl group having from 1 to 4 carbon atoms; each R' is independently hydrogen, a hydrocarbyl or hydrocarbyloxy group having from 1 to 4 carbon atoms, or a halogen atom; n has a value of zero or 1; n' has a value suitably from zero to 10; and each $R^a$ is independently a divalent hydrocarbon group having from 1 to about 6 carbon atoms; and n is 1 or 3;

(ii) component (A1b) is a compound represented by the following Formulas III or IV Formula III
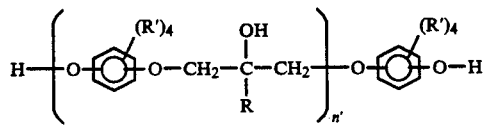

Formula IV
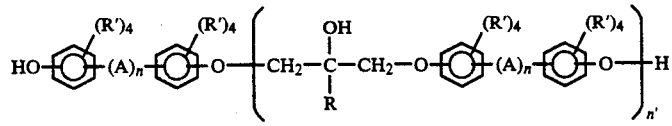

wherein A is a divalent hydrocarbon group having from 1 to 12 carbon atoms, —S—, —S—S—, —SO$_2$—, —SO—, —CO—, —O—CO—O—, or —O—; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen atom; n has a value of zero or 1; and n' has a value from zero to 10;

Formula V
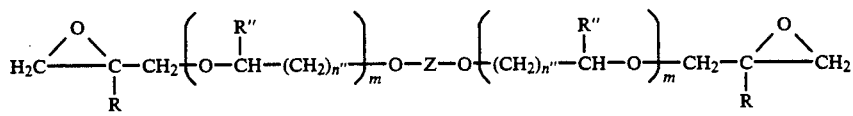

Formula A
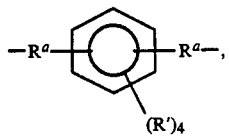

Formula B
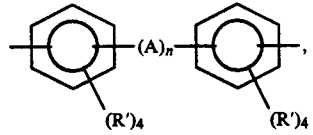

Formula C
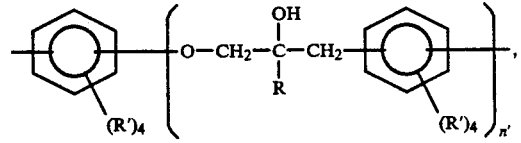

Formula D
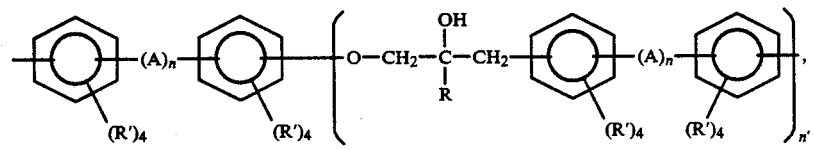

wherein A is a divalent hydrocarbon group having suitably from 1 to 12 carbon atoms; each R is inde- (iii) component (A2) is a compound represented by the following Formulas I or II Formula I

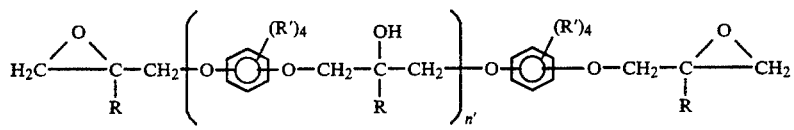

Formula II

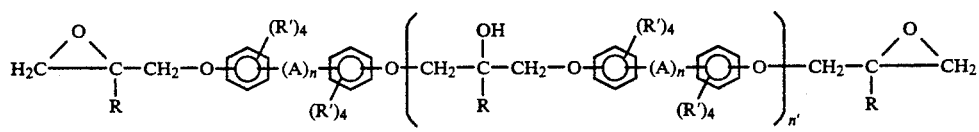

wherein A is a divalent hydrocarbon group having from 1 to 12 carbon atoms, —S—, —S—S—, —SO$_2$—, —SO—, —CO—, —O—CO—O—, or —O—; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen atom; n has a value of zero or 1; and n' has a value from zero to 10;

(iv) component (A3), when present, is a compound represented by the aforementioned Formulas III or IV and may be the same as or different from component (1b);

(v) component (A4), when present, is a monofunctional phenol, organic acid or mercaptan;

(vi) component (B) is a compound represented by the aforementioned Formulas I or II; and (vii) said curing agent is a blocked polyisocyanate, an amino resin, a phenolic resin, a polyester resin, a polyamide, a polyamine, a polyisocyanate or any combination thereof.

6. A curable composition of claim 1, 2, 3 or 4 wherein (i) component (A1a) is one or more compounds represented by the following Formula VIII:

Formula A

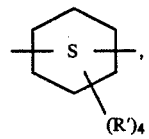

Formula B

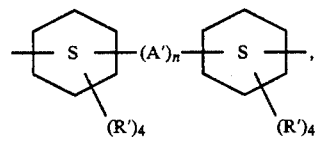

Formula C

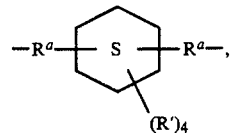

Formula D

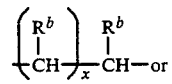

Formula E

Formula VIII

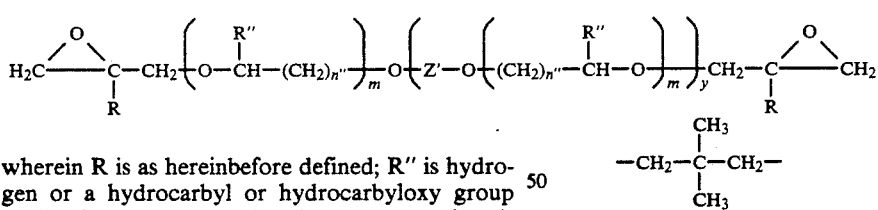

wherein R is as hereinbefore defined; R" is hydrogen or a hydrocarbyl or hydrocarbyloxy group having from 1 to about 4 carbon atoms; each m is independently an integer from zero to 25; n" has a value of 1 to 3; y has a value of zero or 1; and Z' is a group represented by the following Formulas A, B, C, D or E

—CH$_2$—C(CH$_3$)$_2$—CH$_2$— wherein R, R', R", n and n" are defined as hereinbefore; A' and R$^a$ are divalent hydrocarbon groups having from 1 to about 6 carbon atoms; and R$^b$ is hydrogen or a hydrocarbyl group having from 1 to about 6 carbon atoms; x has a value from 2 to about 19;

(ii) component (A1b) is a compound represented by the following Formulas III or IV Formula III

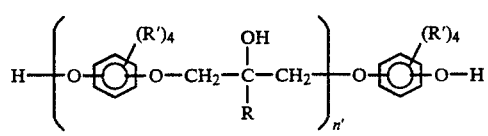

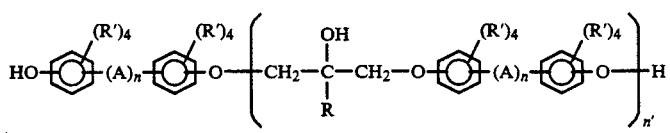

Formula IV wherein A is a divalent hydrocarbon group having from 1 to 12 carbon atoms, —S—, —S—S—, —SO₂—, —SO—, —CO—, —O—CO—O—, or —O—; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen atom; n has a value of zero or 1; and n' has a value from zero to 10;

(iii) component (A2) is a compound represented by the following Formulas I or II

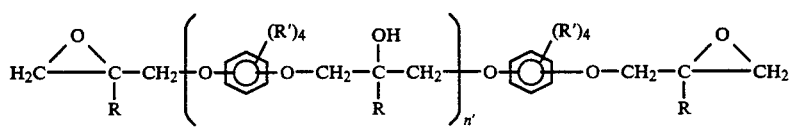

Formula I

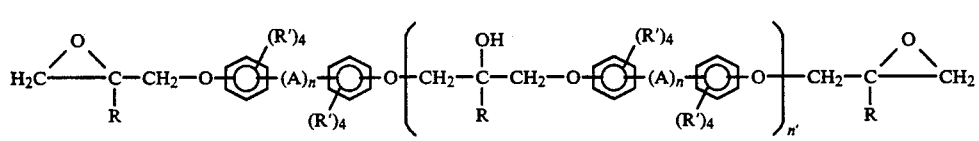

Formula II wherein A is a divalent hydrocarbon group having from 1 to 12 carbon atoms, —S—, —S—S—, —SO₂—, —SO—, —CO—, —O—CO—O—, or —O—; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen atom; n has a value of zero or 1; and n' has a value from zero to 10;

(iv) component (A3), when present, is a compound represented by the aforementioned Formulas III or IV and may be the same as or different from component (1b);

(v) component (A4), when present, is a monofunctional phenol, organic acid or mercaptan;

(vi) component (B) is a compound represented by the aforementioned Formulas I or II; and (vii) said curing agent is a blocked polyisocyanate, an amino resin, a phenolic resin, a polyester resin, a polyamide, a polyamine, a polyisocyanate or any combination thereof.

7. A curable composition of claim 1, 2, 3 or 4 wherein
(i) component (A1a) is a diglycidyl ether of the reaction product of bisphenol A, bisphenol F or bisphenol K with propylene oxide in a ratio of from about 3 to about 4 moles of propylene oxide per mole of bisphenol;
(ii) component (A1b) is bisphenol A, bisphenol F or bisphenol K;
(iII) component (A2) is a diglycidyl ether of bisphenol A, bisphenol F or bisphenol K;
(iv) component (A3), when present, is bisphenol A, bisphenol F or bisphenol K;
(v) component (A4), when present, is nonylphenol;
(vi) component (B) is a diglycidyl ether of bisphenol A, bisphenol F or bisphenol K; and
(vii) said curing agent is a blocked polyisocyanate, an amino resin, a phenolic resin, a polyester resin, a polyamide, a polyamine, a polyisocyanate or any combination thereof.

8. An article resulting from curing the curable compositions of claim 1, 2, 3 or 4.

9. An article resulting from curing the curable compositions of claim 5.

10. An article resulting from curing the curable compositions of claim 6.

11. An article resulting from curing the curable compositions of claim 7.

* * * * *

UNITED STATES PATENT AND TRADEMARK OFFICE
CERTIFICATE OF CORRECTION

PATENT NO. : 5,212,262
DATED : May 18, 1993
INVENTOR(S) : K. W. Anderson, et al

It is certified that error appears in the above-indentified patent and that said Letters Patent is hereby corrected as shown below:

Column 31, Claim 1, lines 65-66, read as:

"about 0.5:1 to about 0.95:1; and component (A4) is present in an amount which provides a ratio of epoxy-reative".

Should read as:

--about 0.5:1 to about 0.95:1; and component (A4) when present is employed in an amount which provides a ratio of epoxy-reative--.

Column 33, Claim 5, line 24, delete "resent" and insert --resented--.
Column 34, Claim 5, line 8, delete the phrase "and n is 1 or 3" and insert the phrase --n' ' has a value of 1 or 3--.

Column 35, Claim 6, line 53, delete the word "to" and insert the word --or--.

Column 38, Claim 7, line 19, delete "(iII)" and insert --(iii)--.

Signed and Sealed this

Tenth Day of May, 1994

Attest:

BRUCE LEHMAN

Attesting Officer     Commissioner of Patents and Trademarks